United States Patent
Knepple et al.

(10) Patent No.: US 10,112,718 B2
(45) Date of Patent: Oct. 30, 2018

(54) ENERGY UNIT, CABIN MOVEMENT AND VEHICLE, AS WELL AS A METHOD FOR SUPPLYING THE CABIN OF A VEHICLE WITH A PROCESS MATERIAL

(71) Applicant: Diehl Aerospace GmbH, Uberlingen (DE)

(72) Inventors: Ronny Knepple, Uberlingen (DE); Bernd Speth, Uberlingen (DE)

(73) Assignee: DIEHL AEROSPACE GMBH, Uberlingen (DE)

(*) Notice: Subject to any disclaimer, the term of this patent is extended or adjusted under 35 U.S.C. 154(b) by 614 days.

(21) Appl. No.: 14/648,515

(22) PCT Filed: Nov. 20, 2013

(86) PCT No.: PCT/EP2013/003497
§ 371 (c)(1),
(2) Date: May 29, 2015

(87) PCT Pub. No.: WO2014/082719
PCT Pub. Date: Jun. 5, 2014

(65) Prior Publication Data
US 2015/0298811 A1   Oct. 22, 2015

(30) Foreign Application Priority Data
Nov. 30, 2012 (DE) .................. 10 2012 023 531

(51) Int. Cl.
*H01M 2/10* (2006.01)
*B64D 11/04* (2006.01)
(Continued)

(52) U.S. Cl.
CPC .......... *B64D 11/04* (2013.01); *B64D 11/0007* (2013.01); *B64D 41/00* (2013.01);
(Continued)

(58) Field of Classification Search
CPC .................................................. H01M 2/1016
See application file for complete search history.

(56) References Cited

U.S. PATENT DOCUMENTS

2007/0113921 A1   5/2007   Capizzo
2008/0026278 A1   1/2008   Iyoda
(Continued)

FOREIGN PATENT DOCUMENTS

DE    10200705491 A1    4/2009
DE    102010018273 A1   10/2011
EP    2213571 A2        8/2010

*Primary Examiner* — Sarah A. Slifka
*Assistant Examiner* — Brian R Ohara
(74) *Attorney, Agent, or Firm* — Scully Scott Murphy and Presser; Frank Digiglio

(57) ABSTRACT

The invention relates in particular to an energy unit (1) for producing an operating material on board a vehicle, comprising a fuel cell unit (2) with at least one fuel cell (3) and a mobile storage unit (5), which is formed separately from the fuel cell unit (2), with a store (6) for storing at least one energy source necessary for operation of the fuel cell unit (2). The mobile storage unit (5) and the fuel cell unit (2) can be coupled with one another, wherein, in the state coupled to one another, at least one first terminal (7) of the mobile storage unit (5) is connected to a corresponding second terminal (8) of the fuel cell unit (2) in such a way that at least the at least one energy source can be supplied from the store (6) to the fuel cell (3).

33 Claims, 2 Drawing Sheets

(51) Int. Cl.
*B64D 11/00* (2006.01)
*B64D 41/00* (2006.01)
*B64G 1/42* (2006.01)

(52) U.S. Cl.
CPC .......... *B64G 1/423* (2013.01); *H01M 2/1016* (2013.01); *B64D 2041/002* (2013.01); *B64D 2041/005* (2013.01); *H01M 2250/20* (2013.01); *Y02T 90/32* (2013.01); *Y02T 90/36* (2013.01)

(56) References Cited

U.S. PATENT DOCUMENTS

| | | | | |
|---|---|---|---|---|
| 2009/0151237 | A1* | 6/2009 | Takegoshi | H01M 8/0618 44/451 |
| 2010/0233552 | A1* | 9/2010 | Knepple | B64D 11/04 429/420 |
| 2011/0281190 | A1* | 11/2011 | Skinkle | H01M 8/04014 429/433 |
| 2015/0041100 | A1* | 2/2015 | Huang | B64D 11/0007 165/42 |

* cited by examiner

ENERGY UNIT, CABIN MOVEMENT AND VEHICLE, AS WELL AS A METHOD FOR SUPPLYING THE CABIN OF A VEHICLE WITH A PROCESS MATERIAL

The invention relates in particular to an energy unit for producing an operating material on board a vehicle, in particular an aircraft, a cabin monument comprising a corresponding energy unit, a vehicle equipped with an energy unit, and a method for supplying the cabin of a vehicle with an operating material.

In accordance with the prior art it is known to use fuel cell systems for energy supply on board aircraft, which fuel cell systems can be operated for example with a liquid fuel.

DE 10 2007 054 291 A1 discloses an energy supply device for providing energy in a passenger aircraft, in which a fuel cell together with fuel store is formed in the manner of a galley trolley. Liquid hydrogen and liquid oxygen are provided as fuel store.

In many of the known systems for producing energy with use of fuel cells, in particular in aircraft, the handling is comparatively complicated and complex. By contrast, a comparatively easily handled system would be desirable for on-board production of energy or an operating material.

On this basis, the object of the invention is to overcome the disadvantages according to the prior art. In particular a comparatively easily handled energy unit or device for producing an operating material on board a vehicle is to be provided. Under the same considerations, a corresponding cabin monument and vehicle as well as a method for supplying a cabin of a vehicle with an operating material is to be provided.

This object is achieved in particular by the independent claims. Embodiments will emerge in particular from the dependent claims.

According to patent claim 1 an energy unit, in particular a device, for producing an operating material on board a vehicle, in particular an aircraft, is provided. The energy unit comprises a fuel cell unit with at least one fuel cell and a mobile storage unit, which is formed separately from the fuel cell unit, in particular in a case-like manner.

A mobile storage unit formed in a case-like manner can be understood in particular to mean cuboidal, in particular closable containers, which can preferably be transported manually by a person, and which may comprise a store, for example received in a container or a housing.

The mobile storage unit is preferably formed as or in the form of a first dolly supporting the store, which means that the storage unit comprises one or more castors by means of which the storage unit can be moved manually on a subsurface.

A corresponding dolly may have dimensions that correspond to a trolley for galleys in passenger aircraft. Trolleys of this type may be formed for example in accordance with the Atlas standard. Other movable containers or receptacles that meet the purposes and requirements specified herein can also be understood as dollies within the context of this application.

Dollies and the like can be designed in particular to be received in appropriately formed and adapted receiving bays of a galley of the vehicle.

Aside from a galley-side integration of the energy unit and/or of the mobile storage unit, for example in the manner of a trolley, the mobile storage unit, and generally the energy unit, can also be accommodated or mounted in other areas of the vehicle. In particular the mobile storage unit and/or the energy unit can be accommodated in the cargo area, in monuments, in recreation areas, washrooms, toilet areas, etc.

As already mentioned, the mobile storage unit comprises a store, in particular in the form of a tank, which is designed and set up to store or to stockpile at least one energy source, in particular fuel, necessary for operation of the fuel cell unit, in particular at least one fuel cell of the fuel cell unit.

The mobile storage unit and the fuel cell unit can be coupled to one another or with one another in such a way that, in the proper state coupled to one another or operating mode, a first terminal of the mobile storage unit is connected to a corresponding second terminal of the fuel cell unit. The term 'couple to one another or with one another', etc. is to be understood broadly in particular, and in this regard is to include arrangements in which the mobile storage unit and the fuel cell unit are formed such that they can be connected to one another in succession, on top of one another, or side by side, can be joined to one another, coupled to one another and/or can be connected to form a functional unit, in particular in a repeatedly detachable manner.

The first terminal and the second terminal particularly preferably are interconnected automatically and an in a manner ready for operation when the storage unit and the fuel cell unit are coupled.

With the proposed energy unit the first and second terminal, when coupled to one another, are coupled with one another in such a way that at least the at least one energy source can be supplied from the store of the fuel cell for operation thereof, in particular for production of electrical energy.

With the proposed energy unit, in particular the provision of the energy source on the basis of the mobile storage unit can be performed in a particularly simple manner. In particular when exchanging a store, which for example is empty or partially empty, for a full store, the fuel cell units may remain in the mounted position and/or location, which considerably simplifies a store change.

With mobile embodiment of the fuel cell unit, for example in the form and handling of a case-like dolly, said fuel cell unit can be removed and/or exchanged in a comparatively simple manner, for example for maintenance purposes. If there is no need to exchange or change the fuel cell unit, the mobile storage unit alone can thus be swapped or changed with the design proposed herein. The complexity can thus be reduced compared with combined integrated systems.

Particularly simple handling is also provided in particular in that the first terminal and the second terminal are automatically interconnected or are connected as soon as the fuel cell unit and the mobile storage units are properly coupled with one another or to one another. In the event of decoupling or separation, the first and second terminal are preferably automatically separated from one another. Reliable operation can be achieved in particular due to the automatic coupling and decoupling.

It should be mentioned that materials such as propylene glycol, methanol, ethanol, propanol, kerosene, diesel, dimethyl ether, N-ethylcarbazole, etc. in particular are considered as energy source. It is also noted that hydrogen in liquid or gaseous form is considered in principle. However, hydrogen as an energy source appears to be more advantageous in bound form for safety reasons. In particular all materials or substances that preferably are liquid, are not explosive, are not combustible, are poorly reactive and/or are not toxic, in particular those that are to be reformed, can be used as energy sources.

In accordance with one embodiment, in the state coupled properly to one another, the least one further terminal of the mobile storage unit and of the fuel cell unit are interconnected. The connection of the corresponding further terminals is such or is established such that electrical energy, thermal energy, electronic data and/or fuel cell waste gases can be exchanged between the mobile storage unit, in particular between the store and fuel cell unit, in particular the fuel cell.

The term fuel cell waste gas or "waste gas" for short is to be understood within the context of the present invention to mean in particular a gas produced during operation of the fuel cell, which gas has a reduced oxygen content compared with air. The oxygen content of the waste gas may be at least 40%, advantageously at least 50% less than the oxygen content of air, in particular ambient air.

The further terminals can be formed and arranged in conformity with the first and second terminal in such a way that further terminals corresponding to one another are automatically interconnected with proper coupling of the storage unit and the fuel cell unit and are automatically separated from one another in the event of decoupling. Simple and also reliable handling during the exchange process can thus be ensured.

In accordance with an advantageous embodiment the fuel cell unit comprises a second dolly, in which the at least one fuel cell is received, wherein the second terminal and where applicable the further terminal is/are mounted on the second dolly. One embodiment of the fuel cell unit in the form of a dolly provides simplified handling during the exchange process, which is advantageous in particular for maintenance purposes. If the fuel cell unit and the mobile storage unit are each formed as a dolly, these can be handled individually or also jointly, in particular in the state coupled to one another, as required.

In particular as a result of a separate embodiment of the fuel cell unit, it is possible to connect the fuel cell unit to storage units of different size and different storage volume. The energy unit can thus be adapted easily to the respective intended purpose and the respective use conditions, such as minimum operating period, etc.

In accordance with a further embodiment, as already mentioned, the first and second terminal and where applicable the further terminals formed in such a way that they are automatically interconnected when the fuel cell unit and the mobile storage unit, in particular the first and second dolly, are properly coupled to one another.

In particular in an embodiment in the form of dollies, the energy unit may also comprise at least one receiving bay of a cabin monument, in particular of a galley, of a vehicle, in particular of a passenger aircraft. The at least one receiving bay is designed to receive therein at least the fuel cell unit and/or the mobile storage unit, in particular the first dolly, in a mobile and exchangeable manner.

In accordance with a further embodiment the fuel cell unit, in particular the second dolly, and the mobile storage unit, in particular the first dolly, can be received and/or removed from the least one receiving bay, separately in each case.

The fuel cell unit, in particular the second dolly, preferably comprises a first interface, and the receiving bay preferably comprises a second interface connectable to the first interface. The first and second interface are formed here in such a way that they are preferably automatically interconnected or separated from one another as the fuel cell unit is introduced into or removed from the receiving bay respectively. The first and second interface are preferably formed in such a way that, when the fuel cell unit is properly coupled via the interfaces, at least an exchange of electrical energy with an external consumer is possible, i.e. an external consumer can be supplied with electrical energy.

In accordance with a preferred embodiment the first and second interface are designed to exchange thermal energy, electrical energy, electrical signals, reaction water and/or fuel cell waste gases. It is thus possible to supply also external consumers, i.e. consumers that are not comprised by the energy unit, with corresponding operating materials. For example it is possible to supply galley apparatuses in a galley of an aircraft with electrical and/or thermal energy. The reaction water formed during operation of the fuel cell can be fed to a consumer in the cabin, in particular directly or indirectly following buffering in a tank.

In view of the fuel cell waste gases, it may be advantageous for the operational reliability if the store can be connected to the fuel cell unit in such a way that in the connected state at least a partial volume of the fuel cell waste gas produced by the fuel cell unit can be introduced into a free storage volume, which forms as the store is emptied, in order to make said free storage volume inert. However, the fuel cell waste gases can also be used at other points for inerting.

In accordance with one embodiment the energy unit further comprises a first casing surrounding the store and/or a second casing surrounding the fuel cell unit, wherein a waste gas tract of the fuel cell unit is formed in such a way that the inner volume of the first and/or second casing can be made inert by waste gases of the fuel cell unit. In this embodiment a particularly reliable mode of operation can be achieved.

In accordance with yet a further embodiment the energy unit also comprises a reformer arranged downstream of the store for converting a primary fuel stored in the store, in particular a liquid fuel, into a secondary fuel necessary for operation of the fuel cell, in particular into a gaseous fuel, wherein the primary fuel may preferably be a propylene/water mixture. The energy source mentioned further above may also be considered for this purpose.

The reformer may be part of the mobile storage unit or of the fuel cell unit. In the first case a reformate is fed as energy source to the fuel cell unit via the first terminal. In the second case, i.e. when the reformer is arranged in the fuel cell unit, the primary fuel is exchanged via the first and second terminal.

According to claim 13 a cabin monument, in particular a galley, for a cabin of a vehicle, in particular of a passenger aircraft, is provided. The cabin monument comprises a special receiving bay, which is designed and set up in such a way that at least one mobile storage unit of an energy unit as described above can be received therein, in such a way that the fuel cell unit of the energy unit, in the properly received state ready for operation, is supplied with an energy source provided by the mobile storage unit, and electrical energy produced by the fuel cell of the fuel cell unit can be supplied to an electrical consumer and/or can be fed into an electrical consumer network of the vehicle, in particular of the cabin and/or the monument.

The electrical consumer may be in particular an electrical consumer, for example of the cabin monument, and/or of the vehicle, in particular passenger aircraft, that is external of the energy unit. With regard to the advantages and advantageous effects of the cabin monument, reference is made in particular to the statements concerning the energy unit, which apply accordingly.

The receiving bay is in particular adapted to the energy unit in such a way that an operating material produced by the energy unit, in particular electrical energy, thermal energy, reaction products and/or waste gases, can be removed from the energy unit and supplied to a respective consumer of the cabin monument, the cabin and/or the vehicle, in particular passenger aircraft.

According to claim 14 a vehicle, in particular a passenger aircraft, is provided, which comprises a cabin with a cabin module as described before or at least one energy unit as described further above. Reference is made to the above statements with regard to advantages and advantageous effects.

In accordance with one embodiment a power supply network of the cabin module or of the energy unit is decoupled from further energy and/or on-board networks of the vehicle in regular operation. The term power supply network is to be understood in particular to mean a supply network with which at least the electrical energy produced by the energy unit can be conveyed to respective consumers. The power supply network here may be a local power supply network. However, it is also possible that the power supply network may be a global power supply network, at least in view of the supply of the cabin with electrical energy. Here, global is to mean in particular that the energy produced by the energy unit can be made available substantially or in principle at any point of the cabin by means of appropriate lines.

The further energy and/or on-board network is/are preferably a power supply network, in particular a supply mains, with which essential, in particular flight-relevant components and systems are operated or fed for operation of the vehicle. The power supply network of the energy unit can then be formed as a network designed to supply non-essential consumers of the vehicle, in particular of the cabin. In this sense the power supply network of the energy unit and the power supply network for essential consumers can be completely separate from one another and can be operated separately. The complete separation can be maintained at least for regular operation, wherein it is conceivable that in the case of an emergency situation with failure of the essential energy supply, the power supply network of the energy unit is or can be connected to the essential power supply network in order to feed emergency power.

A complete separation of the power supply networks for essential consumers of a vehicle, in particular of an aircraft, and non-essential consumers, in particular of the cabin of the vehicle or aircraft, has the advantage that the respective power supply networks can be better adapted to the respective requirements and can be designed accordingly. It should also be noted at this juncture that the power supply network of the energy unit can also be provided and designed for just some of the non-essential consumers. In particular, consumers in which considerable load peaks occur over an operating phase of the vehicle, in particular over a flight phase, for example from takeoff to landing, are considered here. Corresponding consumers for example are apparatuses in the galley of a passenger aircraft designed to provide heat feeds.

According to claim 16 a method is provided for supplying a cabin, in particular a cabin monument of a vehicle, in particular of a passenger aircraft, with at least one operating material. In the case of the proposed method an energy unit formed in accordance with the above embodiments with a fuel cell unit and a mobile storage unit formed separately therefrom is used.

Specifically, in the case of the method the fuel cell unit, in particular a fuel cell of the fuel cell unit, is supplied with an energy source from the store of the mobile storage unit, wherein the fuel cell unit produces the at least one operating material from the energy source. The operating material produced by the fuel cell unit from the energy source, which for example can be present in the form of electrical energy, thermal energy and/or fuel cell waste gases, is supplied in the case of the proposed method to a consumer of the cabin. The consumer in particular may be part of the cabin, in particular of the cabin monument. For example, the consumer may be an electrical apparatus operable in a galley of a vehicle.

The advantage of the method lies in particular in the fact that the fuel cell unit is supplied from a separate mobile storage unit, in particular a separate energy store that is designed to be mobile with respect to the cabin module. This in particular has the advantage of a comparatively simple supply of the fuel cell unit with the energy source.

In accordance with one embodiment of the method the mobile storage unit is coupled exchangeably to the fuel cell unit in order to supply with fuel cell unit with the energy source necessary for operation, wherein terminals for exchanging the energy source when coupling the mobile storage unit to the fuel cell unit are automatically connected to one another. In this variant a particularly user-friendly and safe handling of the energy unit is possible.

In accordance with a further embodiment of the method energy produced by the energy unit, in particular electrical energy, is fed into a power supply network that is completely separate from a further power supply network of the vehicle, in particular aircraft. Here, the power supply network is designed and set up, in the normal operating mode of the vehicle, to supply energy, in particular electrical energy, at least in phases exclusively to consumers that are non-essential for operation of the vehicle. The further power supply network is designed and set up, in the normal operating mode of the vehicle, to supply energy, in particular electrical energy, at least in phases exclusively to consumers that are essential for operation of the vehicle. The proposed division into at least an essential and a non-essential power supply network provides the advantage that the distribution and provision, in particular the prospective provision, of energy can be simplified.

It is noted that, within the scope of the invention, the fuel cell unit and the mobile storage unit can be designed in accordance with the above embodiments. In particular, the mobile storage unit and/or the fuel cell unit, preferably in a case-like embodiment, can be designed in the form of dollies. With an embodiment in the form of dollies, simple handling, in particular when exchanging a respective dolly and/or when connecting a dolly to the respective other component or the other dolly, can be achieved.

With regard to further advantages, reference is made to the above statements and also to the statements further below.

In addition to the above embodiments, different, in particular optional, details will be described hereinafter more precisely.

For inerting, in particular of a casing, the fuel cell unit or the mobile storage unit, the fuel cell can be connected to a gas discharge line, in such a way that fuel cell waste gases can be introduced into a space enclosed by a casing of the fuel cell unit or the storage unit. The fuel cell waste gases in particular may be fuel cell exhaust air. The fuel cell exhaust air can be tapped at the cathode and/or anode and can be used for inerting. Fuel cell cathode exhaust air in particular may be nitrogen-enriched air, which has inerting properties on account of the increased nitrogen content. Fuel cell anode exhaust air in particular can be air enriched with carbon dioxide ($CO_2$), which also has inerting properties.

The casing can be designed for example to receive therein the store or the fuel cell and other components. The casing is preferably gas-tight, which in particular means that the casing can be closed in a gas-tight manner. The term gas-tight in particular is to be understood to mean a seal with respect to hydrogen gases and other gases occurring for, or during, operation of the fuel cell or used for operation of the fuel cell.

By means of an appropriate connection of the inner volumes of the casing to the gas discharge line, these can be filled with fuel cell waste gases and in this respect can be made inert as the oxygen content of the fuel cell waste gases is significantly reduced compared with the external air. The oxygen content or the oxygen concentration in the casing can be reduced in this way in particular in such a manner that it is at least 40%, preferably at least 50% lower than that of conventional ambient air. The lower oxygen content results in a flame-retarding effect, such that particularly safe operation can be ensured.

As has already been mentioned above, the energy unit comprises two separate units: a fuel cell unit and a mobile storage unit. It is also conceivable that the energy unit is divided into more than two separate components or units, in particular that can be handled separately. For example, it would be conceivable that components of an electronic controller, generally electronic components necessary and/or used for operation of the energy unit, are received or accommodated in a separate component or in a separate unit.

Separate units for example can be provided or designed also in order to receive a battery store. The separate individual elements and individual components are formed in particular in such a way that they can be combined in a simple manner to form an overall system. Here, a combination to form the overall system is to be understood in particular such that the individual components are combined to form an article that can be handled individually, in such a way that the individual components are interconnected functionally and in a manner ready for operation.

In the case of the overall system it is not absolutely necessary for the individual components to each have different functions. It is possible in particular that two individual components have the same functions. An example of this would be an overall system in which two storage units and one fuel cell unit are combined, and in which the fuel cells of the fuel cell unit can be supplied by both storage units with the respective energy source. A further example is an overall system with a fuel cell unit, a storage unit and a battery unit which may comprise a secondary battery designed in particular to buffer electrical energy. Further combinations, also with further individual components, are possible.

A functionally and operationally ready combination and connection of the individual components is preferably provided with all individual components in such a way that all necessary and required connections between the individual components are produced automatically with mechanical connection thereof, in particular are produced automatically. To this end, the individual components may each comprise appropriate interfaces and counter interfaces, in particular corresponding to one another in pairs, with respective terminals, contacts, etc., in particular in such a way that the interfaces corresponding to one another and corresponding terminals, contacts, etc. are automatically interconnected with connection of the individual components. Accordingly, an automatic separation of the interfaces, terminals or contacts corresponding to one another can be provided when the individual components are separated again from one another as required.

The overall system can be designed in such a way that the individual components or sub-units are arranged side by side, in succession and/or one above the other in the interconnected state of a suitable arrangement. Here, the overall system can be designed in such a way that the position of the individual components is fixedly predefined. However, it is also possible or conceivable that the individual components can be interconnected with different positioning. In particular in the latter case the respective individual components may each comprise standardized interfaces, that is to say interfaces that can be combined together and arbitrarily with one another in pairs. In terms of the dimensions, the overall system and the individual components can be designed in such a way that the overall system, in the state in which all sub-units are properly interconnected, is the same size as a galley dolly, for example in accordance with the Atlas standard.

Exemplary embodiments of the invention will be explained in greater detail hereinafter on the basis of the drawings, in which:

FIG. 1 shows an energy unit 1 which is designed to produce an operating material on board an aircraft, more specifically in the cabin of an aircraft. The operating material in particular may be electrical energy, thermal energy and/or further operating materials, such as inerting gases, water, etc.

Figure 1:
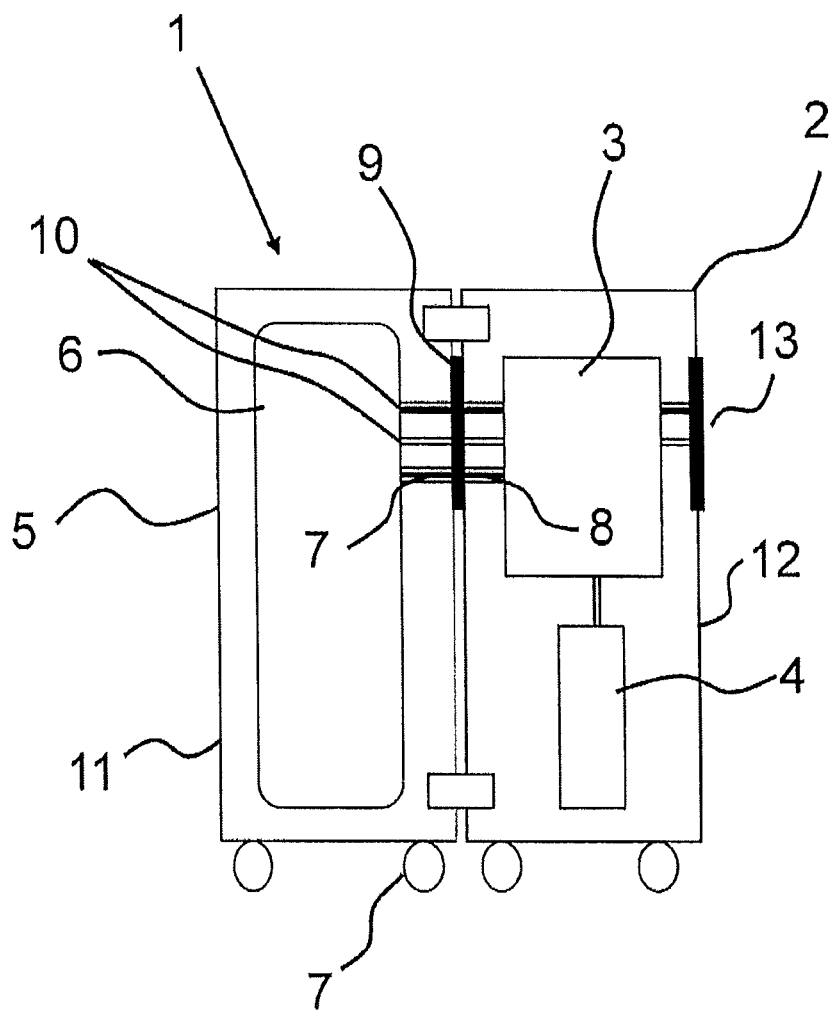
FIG. 1 shows a schematic cross-sectional view of an energy unit according to the invention.

The energy unit 1 comprises a fuel cell unit 2 with a fuel cell 3. The fuel cell unit 2 in the present embodiment also comprises a battery unit 4 with a secondary battery designed to store electrical energy. Here, it is noted that the battery unit 4 is optional, and where appropriate can also be designed in the form of a separate component or sub-unit.

The energy unit 1 further comprises a storage unit 5 that can be handled separately from the fuel cell unit 2. The storage unit 5 comprises a store 6, which is designed and set up to store an energy source necessary for operation of the fuel cell unit 2, in particular an energy source for producing electrical energy by the fuel cell 3. For example, propylene glycol, methanol, ethanol, hydrogen, methane and other, in particular liquid or gaseous, materials are suitable as an energy source. With regard to the possible energy source, reference is made in particular to the above statements.

The fuel cell unit 2 and the storage unit 5 are both formed in the present example as case-like dollies that can be handled separately from one another and that in this respect have corresponding castors 7 for rolling the units 2, 5 on a subsurface.

The storage unit 5 and the fuel cell unit 2 are illustrated in the illustration of FIG. 1 in the state coupled to one another. Generally, the storage unit 5 and the fuel cell unit 2 are designed to be coupled with one another, more specifically in such a way that in the state coupled to one another at least a first terminal 7 of the storage unit 5 is automatically interconnected to a corresponding second terminal 8 of the fuel cell unit 2.

The mutual coupling or connection of the first 7 and second terminal 8 is established in such a way that these are interconnected in a manner ready for operation. In the present example the first 7 and second terminal 8 of FIG. 1 are terminals for the energy source for operation of the fuel cell 3. In this respect the first 7 and second terminal 8 are interconnected in such a way that an energy source contained in the store 6 can be supplied to the fuel cell 3 for operation thereof. In the present embodiment the fuel cell 3 is automatically connected to the store 6 and can be supplied with the energy source as soon as the fuel cell unit 2 and the storage unit 5 are properly interconnected.

The storage unit 5 can be connected to the fuel cell unit 2 for example via lockable clamping, detent and snap-fit elements and/or via quick-action connectors, etc.

The first 7 and second terminal 8 in the present example are each part of a connector 9, which in the present case is a standardized connector 9, insofar as it comprises a defined number and a defined arrangement of respective terminals.

As can be seen in FIG. 1, the connector 9 also comprises two further terminals 10, which example can be provided for the transfer or for the exchange of electrical energy, of fuel cell waste gases for inerting the inner volume of the casing 11 of the storage unit 5, etc.

The use of fuel cell waste gases for inerting is also possible for the fuel cell unit 2, for example by acting on the further casing 12 with fuel cell waste gases, in particular by flooding said further casing. It is also possible to act on the inner volume of the store 6 with inerting fuel cell waste gases.

The fuel cell unit 2 further comprises a first interface 13, which is designed to deliver the operating materials produced by the fuel cell 3, such as electrical energy, thermal energy, and/or fuel cell waste gases, reaction water or product water, etc., to an external consumer, and/or to exchange electronic data or the like with external components, in particular any control units.

In the present example the first interface 13 comprises two further connections 13, which are designed to deliver and/or to transmit or to exchange electrical energy and electronic data to/with external consumers and/or external components.

The first interface 13 preferably has a standardization, i.e. defined number, arrangement and type of terminals. Generally, the connector 9 and the first interface 13 can be configured identically, i.e. can have identical standardization. In this way particularly flexible handling and reciprocal connection of the respective components or interfaces is possible.

Figure 2:
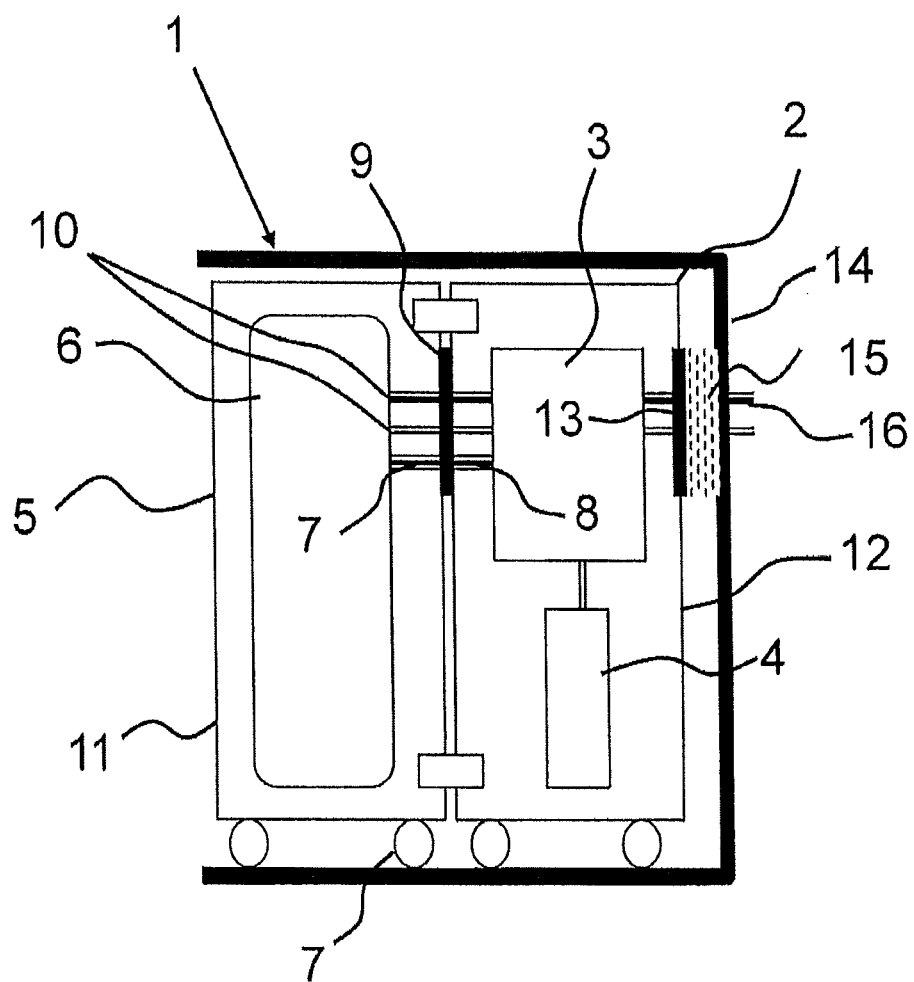
FIG. 2 shows a schematic view of a receiving bay of a cabin monument equipped with the energy unit according to FIG. 1.

As can be seen from FIG. 2, the energy unit 1 may further comprise a receiving bay 14, which is designed and specially set up to receive the components shown in FIG. 1, specifically the fuel cell unit 2 and the storage unit 5, in particular in the state coupled with one another.

The receiving bay 14 is formed especially in such a way that the operating material produced by the fuel cell unit 2 or the fuel cell 3, in particular electrical energy of the fuel cell 3, thermal energy, fuel cell waste gases capable of inerting, water, and also electrical energy, can be supplied to consumers external of the battery. External consumers can be any consumers of a cabin monument or of the cabin, In particular the consumers can be apparatuses of a galley formed as a cabin monument.

The storage unit 5 and the fuel cell unit 2 are received in a mobile manner and exchangeably in the receiving bay. In particular it is possible in the embodiment shown in FIG. 2 to manually detach the storage unit 5 from the fuel cell unit 2 and to remove it from the receiving bay 14, wherein the fuel cell unit 2 remains or can remain in the receiving bay 14. A storage unit 5 with empty store can thus be replaced in a simple manner by a storage unit 5 with filled or full store.

Due to the fact that the fuel cell unit 2 is also received in a mobile manner in the receiving bay 14, said fuel cell unit can be removed or exchanged, likewise in a simple manner, for example for maintenance purposes or in the event of reconfiguration.

The receiving bay 14 can be designed in such a way that dollies, in particular conventional trolleys, which are not designed as energy units 1 in the sense of this application, can also be received therein.

The receiving bay 14 also has a second interface 15 corresponding to the first interface 13. The first interface 13 and second interface 15, and also in particular the fuel cell unit 2 and the receiving bay 14, are formed in such a way that the two interfaces 13, 15 are automatically interconnected when at least the fuel cell unit 2 is received properly in the receiving bay 14, and in such a way that the two interfaces 13, 15 are automatically separated from one another when at least the fuel cell unit 2 is removed from the receiving bay 14.

The second interface 15 has adapted interface terminals 16, at least for the operating materials, i.e. electrical energy, thermal energy, fuel cell waste gases, water, etc., to be transferred to external consumers and may also have further interface connections for data transmission from and/or to the energy unit.

The first interface 13 may be formed correspondingly to the arrangement, number and type of interface terminals 16, in such a way that a transfer of operating materials and, where appropriate, data between the energy unit 1 and external components, in particular consumers, is readily possible in the state coupled to one another.

The energy unit 1, in particular the fuel cell unit 2 or the storage unit 5, may also have a reformer (not shown), which is designed to convert a primary fuel provided by means of the store 6 into a secondary fuel suitable for operation of the fuel cell 3. As has already been mentioned further above, propylene glycol, methanol, ethanol, propanol, kerosene, diesel, dimethyl ether, N-ethylcarbazole, etc. in particular can be used as primary fuel.

The energy unit 1 or combination of energy unit 1 and receiving bay 14 shown in FIG. 1 and FIG. 2 can be in particular part of a cabin monument of a cabin of a passenger aircraft. In other words, the cabin monument may comprise an energy unit 1 with a receiving bay 14, wherein the receiving bay can be integrated into the cabin monument. Due to the energy unit 1, a decentralized supply with at least electrical power is possible in particular. The cabin monument in particular may be a galley, a sanitary module or a recreation module, etc.

With the energy unit 1 proposed in FIG. 1 and FIG. 2 it is possible to supply the cabin or a cabin monument, in particular external consumers provided therein, in a decentralized or local manner with an operating material produced or provided by the energy unit 1. The use of the energy unit 1 thus enables self-sufficient operation of individual segments of the cabin, or even self-sufficient operation of the entire cabin, in particular of a passenger aircraft.

In particular with appropriate dimensioning of the energy unit 1, or possibly a plurality of energy units, it is possible for example that the cabin is supplied self-sufficiently with the respective necessary operating materials, in particular electrical energy. Here, self-sufficiently is to mean in particular that the cabin can be operated independently and completely autonomously of other energy sources and power supply networks provided for operation of the vehicle, in particular passenger aircraft. In particular this means that the electrical energy consumed by the cabin and consumers thereof in the case of usual operation can be produced exclusively by the energy unit 1.

A completely independent supply of the cabin with operating materials is thus possible, said supply in particular being decoupled from and independent of further power supply networks, provided for example for the operation of flight-relevant components. In this regard, this has the advantage that the energy supply systems produced as a result can be dimensioned and designed in accordance with the respective safety requirements, for example in a manner divided into flight-relevant and not flight-relevant.

On the whole, and in particular as is clear from the description of the figures, the energy unit proposed herein enables comparatively simple handling.

LIST OF REFERENCE SIGNS

1 energy unit
2 fuel cell unit
3 fuel cell
4 battery unit
5 storage unit
6 store
7 first terminal
8 second terminal
9 connector
10 further terminals
11 casing
12 further casing
13 first interface
14 receiving bay
15 second interface
16 interface terminal

The invention claimed is:

1. An energy unit for producing an operating material on board a vehicle, comprising a fuel cell unit with at least one fuel cell and a mobile storage unit, which is formed separately from the fuel cell unit, with a store for storing at least one energy source necessary for operation of the fuel cell unit, wherein the mobile storage unit and the fuel cell unit can be coupled with one another, and wherein, in the state coupled to one another, at least a first terminal of the mobile storage unit is connected to a corresponding second terminal of the fuel cell unit in such a way that at least the at least one energy source can be supplied from the store to the fuel cell, at least one further terminal of the mobile storage unit and of the fuel cell unit are interconnected in such a way that electrical energy, thermal energy, electronic data and/or fuel cell waste gases can be exchanged between the mobile storage unit and fuel cell unit, the fuel cell unit further comprising a dolly, in which at least one fuel cell is received, wherein the second terminal and, where applicable, the further terminal is/are mounted on the dolly.

2. The energy unit as claimed in claim 1 wherein the first and second terminal and where applicable further terminals are designed in such a way that these are automatically interconnected when the fuel cell unit and the mobile storage unit are coupled to one another.

3. An energy unit for producing an operating material on board a vehicle, comprising a fuel cell unit with at least one fuel cell and a mobile storage unit, which is formed separately from the fuel cell unit, with a store for storing at least one energy source necessary for operation of the fuel cell unit, wherein the mobile storage unit and the fuel cell unit can be coupled with one another, and wherein, in the state coupled to one another, at least a first terminal of the mobile storage unit is connected to a corresponding second terminal of the fuel cell unit in such a way that at least the at least one energy source can be supplied from the store to the fuel cell, wherein the mobile storage unit comprises a first dolly supporting at least the store, and at least one receiving bay of a cabin monument of a vehicle, wherein the at least one receiving bay is designed to receive therein at least the fuel cell unit and/or the mobile storage unit in a mobile and exchangeable manner, and wherein the fuel cell unit has a first interface, and the receiving bay has a second interface connectable to the first interface, wherein the first and second interface are automatically interconnected or separated from one another as the fuel cell unit is introduced into or removed from the receiving bay, respectively.

4. The energy unit as claimed in claim 3, wherein the first and second interface are designed to exchange thermal energy, electrical energy, fuel cell waste gases, reaction water and/or electrical signals.

5. The energy unit as claimed in claim 1, further comprising a reformer arranged downstream of the store for converting a primary fuel stored in the store into a secondary fuel necessary for operation of the fuel cell, wherein the primary fuel is a propylene/water mixture.

6. A cabin monument for a cabin of a vehicle comprising a receiving bay, which is designed and set up in such a way that at least one mobile storage unit of an energy unit as claimed in claim 1 can be received therein, in such a way that the fuel cell unit of the energy unit, in the properly received state ready for operation, is supplied with an energy source provided by the mobile storage unit, and electrical energy produced by the fuel cell of the fuel cell unit can be supplied to an electrical consumer and/or can be fed into an electrical consumer network of the vehicle.

7. A vehicle comprising a cabin with a cabin monument as claimed in claim 6.

8. The vehicle as claimed in claim 7, wherein a power supply network of the cabin monument is decoupled from further energy and/or on-board networks of the vehicle in regular operation.

9. A method for supplying a cabin of a vehicle with at least one operating material, wherein a fuel cell unit of an energy unit as claimed in claim 1 is supplied with an energy source of a store of a mobile storage unit formed separately from the fuel cell unit for production of the at least one operating material, and the operating material produced by the fuel cell unit is supplied to a consumer of the cabin.

10. The method as claimed in claim 9, wherein the mobile storage unit is coupled exchangeably to the fuel cell unit in order to supply the fuel cell unit with the energy source necessary for operation, wherein terminals for exchanging the energy source when coupling the mobile storage unit to the fuel cell unit are automatically connected to one another.

11. The method as claimed in claim 9 wherein energy produced by the energy unit is fed into a power supply network that is completely separate from a further power supply network of the vehicle wherein the power supply network is designed and set up, in the normal operating mode, to supply energy at least in phases exclusively to consumers that are non-essential for operation of the vehicle, and wherein the further power supply network is designed and set up, in the normal operating mode, to supply energy at least in phases exclusively to consumers that are essential for operation of the vehicle.

12. The energy unit as claimed in claim 1, wherein said vehicle is an aircraft.

13. The energy unit as claimed in claim 1, wherein said mobile storage unit is formed in a case-like manner.

14. The energy unit as claimed in claim 3, wherein the fuel cell unit and the mobile storage unit can be received in and/or removed from the at least one receiving bay, separately in each case.

15. An energy unit for producing an operating material on board a vehicle, comprising a fuel cell unit with at least one fuel cell and a mobile storage unit, which is formed separately from the fuel cell unit, with a store for storing at least one energy source necessary for operation of the fuel cell unit, wherein the mobile storage unit and the fuel cell unit can be coupled with one another, and wherein, in the state coupled to one another, at least a first terminal of the mobile storage unit is connected to a corresponding second terminal of the fuel cell unit in such a way that at least the at least one energy source can be supplied from the store to the fuel cell, wherein the store can be connected to the fuel cell unit in such a way that in the connected state at least a partial volume of the waste gas produced by the fuel cell unit can be introduced into a free storage volume, which forms as the store is emptied, in order to make said free storage volume inert.

16. An energy unit for producing an operating material on board a vehicle, comprising a fuel cell unit with at least one fuel cell and a mobile storage unit, which is formed separately from the fuel cell unit, with a store for storing at least one energy source necessary for operation of the fuel cell unit, wherein the mobile storage unit and the fuel cell unit can be coupled with one another, and wherein, in the state coupled to one another, at least a first terminal of the mobile storage unit is connected to a corresponding second terminal of the fuel cell unit in such a way that at least the at least one energy source can be supplied from the store to the fuel cell, the energy unit further comprising a first casing surrounding the store and/or a second casing surrounding the fuel cell unit, wherein a waste gas tract of the fuel cell unit is formed in such a way that the inner volume of the first and/or second casing can be made inert by waste gases of the fuel cell unit.

17. The energy unit as claimed in claim 3, further comprising a reformer arranged downstream of the store for converting a primary fuel stored in the store into a secondary fuel necessary for operation of the fuel cell, wherein the primary fuel is a propylene/water mixture.

18. The energy unit as claimed in claim 15, further comprising a reformer arranged downstream of the store for converting a primary fuel stored in the store into a secondary fuel necessary for operation of the fuel cell, wherein the primary fuel is a propylene/water mixture.

19. The energy unit as claimed in claim 16, further comprising a reformer arranged downstream of the store for converting a primary fuel stored in the store into a secondary fuel necessary for operation of the fuel cell, wherein the primary fuel is a propylene/water mixture.

20. A cabin monument for a cabin of a vehicle comprising a receiving bay, which is designed and set up in such a way that at least one mobile storage unit of an energy unit as claimed in claim 3 can be received therein, in such a way that the fuel cell unit of the energy unit, in the properly received state ready for operation, is supplied with an energy source provided by the mobile storage unit, and electrical energy produced by the fuel cell of the fuel cell unit can be supplied to an electrical consumer and/or can be fed into an electrical consumer network of the vehicle.

21. A cabin monument for a cabin of a vehicle comprising a receiving bay, which is designed and set up in such a way that at least one mobile storage unit of an energy unit as claimed in claim 15 can be received therein, in such a way that the fuel cell unit of the energy unit, in the properly received state ready for operation, is supplied with an energy source provided by the mobile storage unit, and electrical energy produced by the fuel cell of the fuel cell unit can be supplied to an electrical consumer and/or can be fed into an electrical consumer network of the vehicle.

22. A cabin monument for a cabin of a vehicle comprising a receiving bay, which is designed and set up in such a way that at least one mobile storage unit of an energy unit as claimed in claim 16 can be received therein, in such a way that the fuel cell unit of the energy unit, in the properly received state ready for operation, is supplied with an energy source provided by the mobile storage unit, and electrical energy produced by the fuel cell of the fuel cell unit can be supplied to an electrical consumer and/or can be fed into an electrical consumer network of the vehicle.

23. A vehicle comprising a cabin with a cabin monument as claimed in claim 20.

24. A vehicle comprising a cabin with a cabin monument as claimed in claim 21.

25. A vehicle comprising a cabin with a cabin monument as claimed in claim 22.

26. The vehicle as claimed in claim 23, wherein a power supply network of the cabin monument is decoupled from further energy and/or on-board networks of the vehicle in regular operation.

27. The vehicle as claimed in claim 24, wherein a power supply network of the cabin monument is decoupled from further energy and/or on-board networks of the vehicle in regular operation.

28. The vehicle as claimed in claim 25, wherein a power supply network of the cabin monument is decoupled from further energy and/or on-board networks of the vehicle in regular operation.

29. The energy unit as claimed in claim 3, wherein said vehicle is an aircraft.

30. The energy unit as claimed in claim 15, wherein said vehicle is an aircraft.

31. The energy unit as claimed in claim 16, wherein said vehicle is an aircraft.

32. The energy unit as claimed in claim 3, wherein said mobile storage unit is formed in a case-like manner.

33. The energy unit as claimed in claim 15, wherein said mobile storage unit is formed in a case-like manner.

* * * * *